(12) United States Patent
Chen et al.

(10) Patent No.: US 8,884,953 B2
(45) Date of Patent: Nov. 11, 2014

(54) METHOD AND APPARATUS FOR ENCODING 3D MESH MODELS, AND METHOD AND APPARATUS FOR DECODING ENCODED 3D MESH MODELS

(75) Inventors: Qu Qing Chen, Beijing (CN); Kang Ying Cai, Beijing (CN); Jun Teng, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 438 days.

(21) Appl. No.: 13/138,297

(22) PCT Filed: Feb. 5, 2010

(86) PCT No.: PCT/EP2010/051443
§ 371 (c)(1),
(2), (4) Date: Jul. 28, 2011

(87) PCT Pub. No.: WO2010/089380
PCT Pub. Date: Aug. 12, 2010

(65) Prior Publication Data
US 2011/0285708 A1    Nov. 24, 2011

(30) Foreign Application Priority Data

Feb. 6, 2009 (EP) ..................................... 09305113

(51) Int. Cl.
*G06T 17/20* (2006.01)
*G06T 9/00* (2006.01)
(52) U.S. Cl.
CPC ................ *G06T 9/001* (2013.01); *G06T 9/004* (2013.01)
USPC ............ 345/420; 345/419; 382/154; 382/243
(58) Field of Classification Search
USPC ........................... 345/419, 420; 382/243, 154
See application file for complete search history.

(56) References Cited

U.S. PATENT DOCUMENTS 5,736,987 A * 4/1998 Drucker et al. ................ 345/420
6,167,159 A * 12/2000 Touma et al. .................. 382/242
(Continued)

FOREIGN PATENT DOCUMENTS

| JP | 2000175190 | 6/2000 |
| JP | 2008538435 | 10/2008 |
| WO | WO2007035340 | 3/2007 |

OTHER PUBLICATIONS

Touma C et al., "Triangle Mesh Compression", Proceedings / Computer and Graphics Interface 98, Jan. 1, 1998, pp. 26-34.

(Continued)

*Primary Examiner* — Kimbinh T Nguyen
(74) *Attorney, Agent, or Firm* — Tutunjian & Bitetto, P.C.

(57) ABSTRACT

3D mesh models are widely used in various applications for representing 3D objects. These models are made of vertices and corresponding triangles, which can be compressed based on prediction and residuals. The present invention improves the accuracy of parallelogram prediction, particularly near sharp features. The proposed 3D mesh model encoding comprises analyzing the spatial or dihedral angles between triangles, clustering triangles with similar or equal dihedral angles, and defining a representative dihedral angle for each cluster. Triangles of each cluster are then encoded relative to individual prediction triangles having the representative dihedral angle according to the cluster. Additionally, the prediction triangle may be mirrored. An indication of the encoding mode is inserted into each vertex of the encoded bitstream. A decoder extracts the encoding mode indication, reconstructs the individual prediction triangles based on the respective representative dihedral angles and performs triangle prediction and reconstruction.

12 Claims, 6 Drawing Sheets

(56) References Cited

U.S. PATENT DOCUMENTS 6,438,266 B1 * 8/2002 Bajaj et al. .................. 382/243
6,546,141 B1   4/2003 Jung et al.
8,131,094 B2   3/2012 Chang et al.

OTHER PUBLICATIONS

Gumholds et al., "Higher Order Prerdiction for Geometry Compression", Shape Modeling International, 2003, May 2003, pp. 59-286.

Lee et al., "Angle-Analyzer: A Triangle-Quad Mesh CODEC", Computer Graphics Formum, vol. 21, No. 3, Amsterdam, NL, Jan. 1, 2002, pp. 383-392.

Peng et al., "Technologies for 3D Mesh Cmpression: A Survey", Journal of Visual Communication and Image Representation, vol. 16, No. 6, Dec. 1, 2005, pp. 688-733.

Alliez et al., Mesh Coding: Application to Texture and Scalable 3D Scene Coding, vol. 55, No. 3/04, Paris, FR, Mar. 1, 2000, pp. 117-130.

Search Report Dated Apr. 26, 2010.

* cited by examiner a)

b)

a) b)

a)

b)

US 8,884,953 B2

METHOD AND APPARATUS FOR ENCODING 3D MESH MODELS, AND METHOD AND APPARATUS FOR DECODING ENCODED 3D MESH MODELS

This application claims the benefit, under 35 U.S.C. §365 of International Application PCT/EP2010/051443, filed Feb. 5, 2010, which was published in accordance with PCT Article 21(2) on Aug. 12, 2010 in English and which claims the benefit of European patent application No. 09305113.4, filed Feb. 6, 2009.

FIELD OF THE INVENTION

This invention relates to a method and an apparatus for encoding 3D mesh models, and a method and an apparatus for decoding encoded 3D mesh models.

BACKGROUND OF THE INVENTION

Three-dimensional (3D) meshes are widely used in various applications for representing 3D objects, such as video games, engineering design, e-commerce, virtual reality, and architectural and scientific visualization. Usually their raw representation requires a huge amount of data. However, most applications prefer compact 3D mesh representation for storage or transmission. Various algorithms have been proposed since the early 1990s for efficiently compressing 3D meshes, e.g. "Technologies for 3D mesh compression: A survey", by Jingliang Peng, Chang-Su Kim, C.-C. Jay Kuo, ELSEVIER Journal of Visual Communication and Image Representation, 2005, pp. 688-733. Moreover, a rapidly growing demand for 3D mesh models can be expected due to internet based 3D applications, e.g. games.

Typically, 3D meshes are represented by three types of data: connectivity data, geometry data and property data. Connectivity data describe the adjacency relationship between vertices, geometry data specify vertex locations, and property data specify attributes such as the normal vector, material reflectance and texture coordinates. Most 3D compression algorithms compress connectivity data and geometry data separately. The coding order of geometry data is determined by the underlying connectivity coding. Geometry data is usually compressed by three main steps: quantization, prediction and statistical encoding. 3D mesh property data are usually compressed in a similar manner.

The prediction step exploits the correlation between adjacent vertex positions, which is most crucial in improving geometry compression efficiency. The most widely used prediction strategy is parallelogram prediction, as proposed by literature [TG98] (C. Touma, C. Gotsman: "Triangle mesh compression", Proceedings of Graphics Interface, 1998, pp. 26-34). This approach is shown in FIG. 1. The shaded area has already been encoded/decoded. The position of a new vertex r is predicted by the reference triangle $\Delta uvw$ using the equation $$r^p = u + v - w \qquad (\text{Eq.1})$$

Parallelogram prediction is based on the assumption that the four vertices u, v, w, r, are co-planar and construct a flat parallelogram. However, this basic assumption is not always true. In FIG. 1, there is a spatial angle θ between the reference triangle $\Delta uvw$ and the new, so-called spanning triangle $\Delta urv$. This spatial angle, referred to as dihedral angle, is encoded. It defines the rotation of the spanning triangle $\Delta urv$ around the common side uv that the reference triangle $\Delta uvw$, the co-planar prediction triangle $\Delta ur^p v$ and the spanning triangle $\Delta urv$ have. The prediction error or residual between the predicted vertex $r^p$ and the actual vertex r can be expressed as a vector $res_p$.

Even for a simple model, such as a box shown in FIG. 2, the residual after parallelogram prediction may be quite big: the difference vector $res_p$ between the predicted vertex $r^p$ and the actual vertex r is even longer than a box side.

Typical failure cases are shown in FIG. 3 a). Triangles of the encoded/decoded area $A_{ed}$ are usually not co-planar. In one failure case, the new vertex c is not in the same plane with the reference triangle $\Delta abd$. Thus, the residual C1 is significant. Also in another failure case there is a significant difference C2 between a predicted position $h^p$ and an actual vertex h, although the new vertex h is in the same plane as the reference triangle $\Delta feg$. To improve the prediction accuracy, [TG98] uses the dihedral angle θ shown in FIG. 3b) between $\Delta ebg$ and $\Delta bdg$ to predict the neighboring dihedral angle between $\Delta adb$ and $\Delta abc$. Another approach[1] uses a multi-way parallelogram prediction scheme shown in FIG. 4. The multi-way prediction exploits all possible reference triangles and uses the average of all single-way predicted positions as the multi-way prediction result. [GA03][2] and [LAM02][3] divide vertex positions into tangential coordinates and dihedral angles, as shown in FIG. 5. The dihedral angle between reference triangle and spanning triangle is predicted and encoded using this kind of local coordinate system. [GA03] fits a higher order surface to the encoded vertices and uses the high order surface to predict the dihedral angle α.

[1] D. Cohen-Or, R. Cohen, and R. Irony: "Multiway geometry encoding", Technical report, School of Computer Science, Tel Aviv University, 2002
[2] S. Gumhold, R. Amjoun: "Higher order prediction of geometry compression", Proceedings of the Shape Modeling International, Seoul, 2003, 59~66
[3] H. Lee, O. Allidz, M. Desbrun: "Angle-analyzer: A triangle-quad mesh codec", Eurographics Conference Proceedings, 2002, 383~392

Although many algorithms have been proposed to improve the accuracy of parallelogram prediction, vertices near sharp features, i.e. the area with highly varying curvature, still have relatively large residuals. The corresponding dihedral angles can not be deduced well from the reference triangles which are usually on the opposite side of the sharp feature. Most prediction schemes constrain the reference triangles to be on the same smooth surface as the spanning triangle, ie. the one that includes the actual new vertex. Although [GA03] works on making accurate prediction of the dihedral angle α, the vertices for fitting the high order surface are restricted in the already encoded and nearly flat region around the reference triangle, and the extra high order surface fitting step also significantly decreases the speed of both geometry encoder and decoder.

To improve geometry compression efficiency particularly of 3D meshes with lots of sharp features, such as typical 3D engineering models, an efficient prediction strategy specially designed for vertices on sharp features is needed.

SUMMARY OF THE INVENTION

The present invention is based on the recognition of the fact that in many 3D mesh models certain ranges of dihedral angles are used much more frequently than others. Thus, it is possible during encoding to reduce redundancy.

In principle, the invention comprises in one aspect steps of analyzing the dihedral angles between adjacent triangles of a 3D mesh, wherein it is determined that many of the dihedral angles are equal or substantially equal, defining at least one range of dihedral angles around said equal or substantially equal dihedral angles and defining a corresponding representative dihedral angle, and encoding dihedral angles that are equal or substantially equal to the representative dihedral angle relative to the representative dihedral angle. Other dihedral angles may be encoded conventionally, or clustered into another range with another representative. An indication of the encoding mode is inserted into the triangles of the encoded 3D mesh. Only those dihedral angles between spanning triangles and their respective reference triangles need to be considered.

In another aspect, the invention comprises in principle steps of determining a representative dihedral angle, extracting from an encoded 3D mesh an indication of the encoding mode of a spanning triangle, and depending on the indication reconstructing the spanning triangle based on either only the reference triangle, or based on the reference triangle and a prediction triangle, wherein the dihedral angle between the reference triangle and the prediction triangle is said representative dihedral angle.

The present invention is suitable for increasing coding efficiency and improving prediction accuracy, especially on 3D meshes with many sharp features, such as 3D engineering models. This makes a geometry coder much more efficient. The invention can be used for encoding triangles that are in different spatial planes, and in particular encoding their dihedral angles, based on prediction.

According to one aspect of the invention, a method for encoding a 3D mesh model composed of triangles represented by connectivity data, geometry data and property data comprises steps of determining pairs of triangles, each pair having a reference triangle and a triangle to be predicted, wherein both triangles have a common side along a first axis, for each of said pairs of triangles, determining a dihedral angle between the reference triangle and the triangle to be predicted, analyzing for the 3D mesh model the dihedral angles of the pairs of triangles and, based on said analyzing, defining at least a first range of dihedral angles, wherein a plurality of said dihedral angles are within the first range of dihedral angles, defining for said first range of dihedral angles a first representative dihedral angle, encoding the triangles of the 3D mesh model, wherein residuals between reference triangles and corresponding predicted triangles are determined and encoded, and wherein if the dihedral angle between a reference triangle and a corresponding predicted triangle is within the first range of dihedral angles, said encoding uses prediction based on an enhanced prediction triangle, wherein the dihedral angle between the reference triangle and the enhanced prediction triangle is said representative dihedral angle, calculating and encoding a residual between said triangle to be predicted and said enhanced prediction triangle, and associating with the encoded residual an indication indicating that it refers to said representative dihedral angle.

One aspect of the invention concerns a corresponding apparatus for encoding 3D mesh models.

In one embodiment of the encoding method, a first enhanced prediction triangle of a first mode and a second enhanced prediction triangle of a second mode are mirrored along a co-planar second axis that is orthogonal to said first axis, and a second indication is associated with the encoded residual. The second indication indicates whether the residual refers to the prediction triangle of the first or the second mode.

In one embodiment of the encoding method, in the first mode the enhanced prediction triangle corresponds to a co-planar parallelogram extension of the reference triangle that is rotated by said representative dihedral angle on the first axis, and wherein the enhanced prediction triangles of the first and second mode are co-planar and both have said side along the first axis common with the reference triangle.

According to another aspect of the invention, a signal comprises an encoded 3D mesh model composed of triangles, the encoded 3D mesh model comprising residual data for a plurality of triangles, wherein the residual data are suitable for reconstructing a next triangle based on a reference triangle, wherein the reference triangle and the next triangle have a common side, and wherein the residual data comprise an indication indicating that the encoding of the next triangle is relative to a prediction triangle also having said common side, wherein the dihedral angle between the prediction triangle and the reference triangle is a predefined dihedral angle.

In one embodiment of the signal aspect of the invention, the residual data further comprise an indication indicating whether said encoding refers to a first or a second prediction triangle, wherein the second prediction triangle ($T_{adv\_pred2}$) can be obtained from the first prediction triangle ($T_{adv\_pred1}$) by mirroring or rotating along a co-planar axis (Y) that is orthogonal on said common side.

In one embodiment of the signal aspect, the signal further comprises the value of said predefined dihedral angle.

According to yet another aspect of the invention, a method for decoding an encoded 3D mesh model being composed of triangles comprises steps of determining a first representative dihedral angle, extracting from the encoded 3D mesh model residual data relating to a reference triangle and to a next triangle to be reconstructed, wherein the data have associated an indication indicating a coding mode, decoding from the residual data a residual comprising a residual triangle or residual vector, reconstructing the triangle to be reconstructed based on a prediction from said reference triangle, wherein the reference triangle and the reconstructed triangle have a common side along a first axis, and wherein in response to said indication a prediction mode is used that comprises combining the residual with a predefined prediction triangle, wherein the dihedral angle between the reference triangle and the predefined prediction triangle is said first representative dihedral angle.

One aspect of the invention concerns a corresponding apparatus for decoding 3D mesh models.

In one embodiment of the decoding method, in a first prediction mode the residual is added to a first prediction triangle and in a second prediction mode the residual is added to a second prediction triangle, the first and second prediction triangles having a common side with the reference triangle along said first axis and being mirrored on a second axis that is orthogonal to said first axis.

Preferably, the prediction triangle can be generated by constructing an auxiliary triangle as a parallelogram extension of the reference triangle. The reference triangle and the corresponding auxiliary triangle are co-planar, so that the dihedral angle between each of them and the spanning triangle to be encoded is the same. In the next step, the auxiliary triangle is rotated around the axis of the common side that the reference triangle and the auxiliary triangle have. However, although this method is optimized for many existing 3D mesh models, there are generally also other methods usable for constructing prediction triangles, depending on the mesh elements of the 3D mesh model.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 conventional parallelogram prediction.

DETAILED DESCRIPTION OF THE INVENTION

The invention relates to an advanced prediction scheme for further improving the prediction accuracy during geometry compression of 3D meshes. The dihedral angles between each pair of reference and spanning triangles are analyzed, and frequently used dihedral angles are detected and clustered. That is, one or more clusters are created depending on the dihedral angles used in the current 3D mesh model, such that many of the dihedral angles fall into a cluster. For each cluster, a representative angle is defined. If many of the dihedral angles fall into a cluster, the representative angle of such cluster is used to define the prediction mode. An encoder will choose the proper prediction mode for each vertex. The predicted position is generated by a rotation operation and, in one embodiment, by an additional mirror mapping operation after traditional parallelogram prediction. The rotation angle and whether to do the mirror mapping are decided according to the prediction mode.

Figure 8:
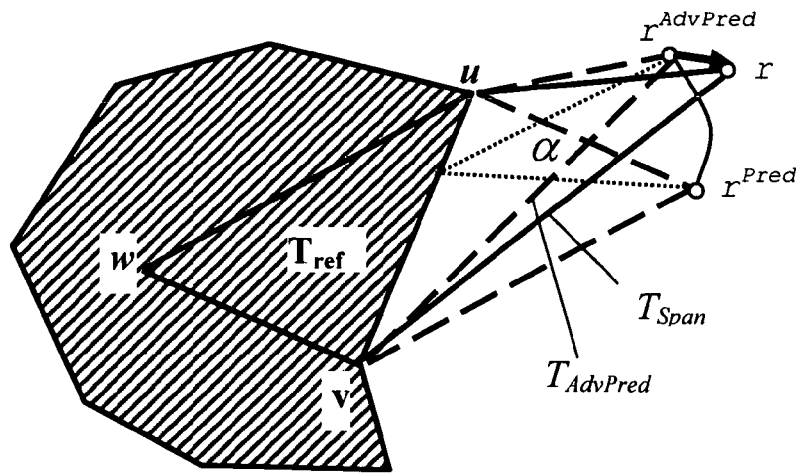
FIG. 8 improved parallelogram prediction using a representative dihedral angle.

In the following, various embodiments of the invention are described. FIG. 8 shows an example of the prediction scheme that is based on an advanced prediction triangle instead of a conventional flat prediction triangle.

The advanced prediction triangle, as defined by one side uv of the reference triangle $T_{ref}$ (or $\Delta$uvw) and an advanced predicted vertex $r^{AdvPred}$, is used to predict the spanning triangle $T_{span}$ (or $\Delta$urv), which is defined by said side uv of the reference triangle and the actual vertex r. As can be seen, the residual (i.e. the prediction error) between r and $r^{AdvPred}$ is much smaller than that between r and the conventionally predicted vertex $r^{Pred}$. The additional cost for encoding the dihedral angle $\alpha$ is minimized by using the below-described angle clustering. Therefore the actual vertex is cheaper to encode using the advanced predicted vertex, since it uses less data. Still the shape of the advanced prediction triangle $T_{AdvPred}$ is the same as that of the auxiliary triangle ($\Delta ur^{Pred}v$), i.e. they have the same angles and side lengths (in below-described embodiments with two advanced prediction triangles, this is still true, since both are mirrored, i.e. two angles and two sides are just exchanged). The shape of the spanning triangle $T_{Span}$ however may be different. It is to be noted here that the reference triangle $T_{ref}$ and the auxiliary triangle $\Delta ur^{Pred}v$ are co-planar, whereas the advanced prediction triangle $T_{AdvPred}$ ($\Delta ur^{AdvPred}v$) has a dihedral angle $\alpha$ against them. In one embodiment, the advanced prediction triangle $T_{Advpred}$ and the spanning triangle $T_{span}$ have substantially the same dihedral angle $\alpha$ against the reference plane of $T_{ref}$. In another embodiment, as described below, the dihedral angle of the spanning triangle may differ from the dihedral angle of the advanced prediction triangle within a defined, small range.

Along the vertex ordering dictated by connectivity coding, a geometry encoder according to one aspect of the invention first calculates the dihedral angles between pairs of a reference and a spanning triangle each. The possible gain is calculated for a prediction residual that remains after rotating the predicted position to (substantially) the same plane as the spanning triangle, and optionally additional mirror mapping along the local Y axis. The local Y axis corresponds with the side common to the reference triangle and the spanning triangle. Then all the dihedral angles are analyzed using angle clustering: clusters are adaptively defined according to the actual distribution of angles, similar or equal angles are assigned to a cluster, and the number of angles in each cluster is determined.

In one exemplary embodiment, clusters are sorted by the number of vertices falling into them, in decreasing order. If the first several clusters are dominant, i.e. including most of the vertices, and the gain of advanced prediction residual is relative large compared to the conventional prediction residual, the advanced parallelogram prediction scheme according to the invention is used for geometry encoding. The representative dihedral angles of the first several clusters define the prediction modes. In principle, one cluster is enough, but depending on the 3D mesh model, the efficiency may be higher with more clusters. Otherwise, if the dihedral angles of the 3D mesh model are evenly spread over a wide range, the traditional parallelogram prediction may be better.

Then the geometry data are compressed. If the advanced parallelogram prediction scheme is adopted, the advanced parallelogram predictor will first choose a prediction mode. Advantageously, it will choose for each vertex to be encoded the prediction mode that generates the smallest residual. The new vertex is predictively encoded with a rotation by the representative dihedral angle of the cluster, and optionally a mirror mapping step.

Figure 9:
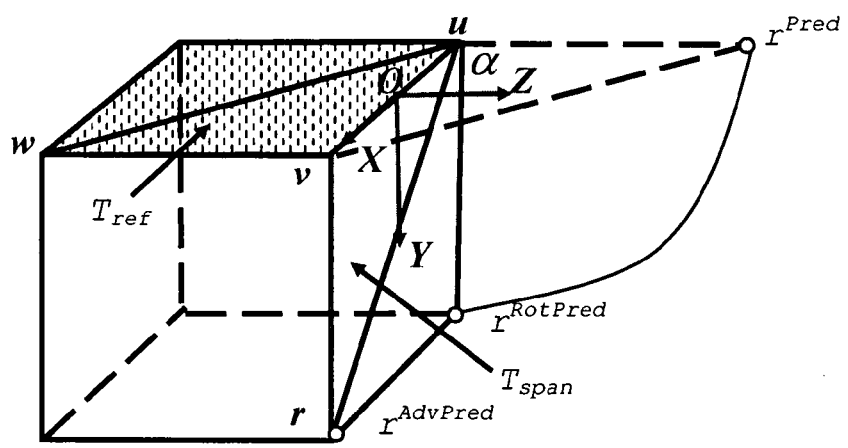
FIG. 9 a 3D mesh model of a box that uses improved parallelogram prediction.

FIG. 9 shows an example where it is advantageous to use mirror mapping. The 3D mesh model is a (substantially) rectangular box. An analysis of the dihedral angles results in the definition of a cluster around a representative angle of 270 degrees. A reference triangle $T_{ref}$ is mapped to a co-planar auxiliary triangle $\Delta ur^{Pred}v$, which is then rotated by the representative dihedral angle around the common side of both triangles, i.e. the local X axis. The first predicted vertex $r^{Pred}$ is mapped to a second predicted vertex $r^{RotPred}$. The resulting first advanced prediction triangle $\Delta ur^{RotPred}v$ is mirrored at its co-planar local Y axis at (u+v)/2, i.e. in the middle between u and v, such that the mirrored triangle also has uv as one of its sides. The resulting mirrored triangle $\Delta ur^{AdvPred}v$ fully matches the spanning triangle $T_{span}$ (or $\Delta$urv). In the next step it is determined which of the three prediction triangles is the best: $\Delta ur^{Pred}v$, $\Delta ur^{RotPred}v$ or $\Delta ur^{AdvPred}v$. This is determined by comparing their respective residuals, and choosing the prediction triangle that generates the smallest residual. Obviously it will be $\Delta ur^{AdvPred}v$ in this case, since the residual is zero. Thus, for encoding the spanning triangle $T_{span}$ it is sufficient to identify the reference triangle $T_{ref}$ and the edge uv (as usual in 3D mesh compression), the cluster to which the prediction belongs (thus identifying the dihedral angle) and the fact that mirror mapping is used. In other words, when the reference triangle $T_{ref}$ and the edge uv are identified, the encoded spanning triangle $T_{span}$ comprises only an indication of the cluster (one bit in this example, since there is only one cluster) and an indication of the mirror mapping step (one bit).

Figure 13:
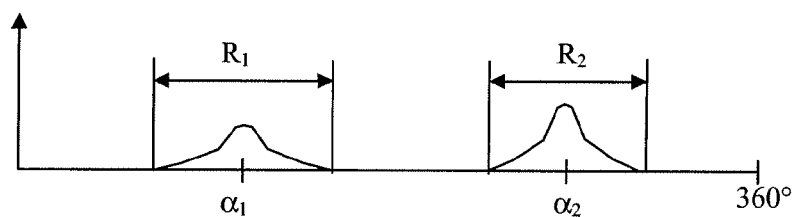
FIG. 13 a prediction mode histogram of the exemplary 3D mesh model.
Figure 13:
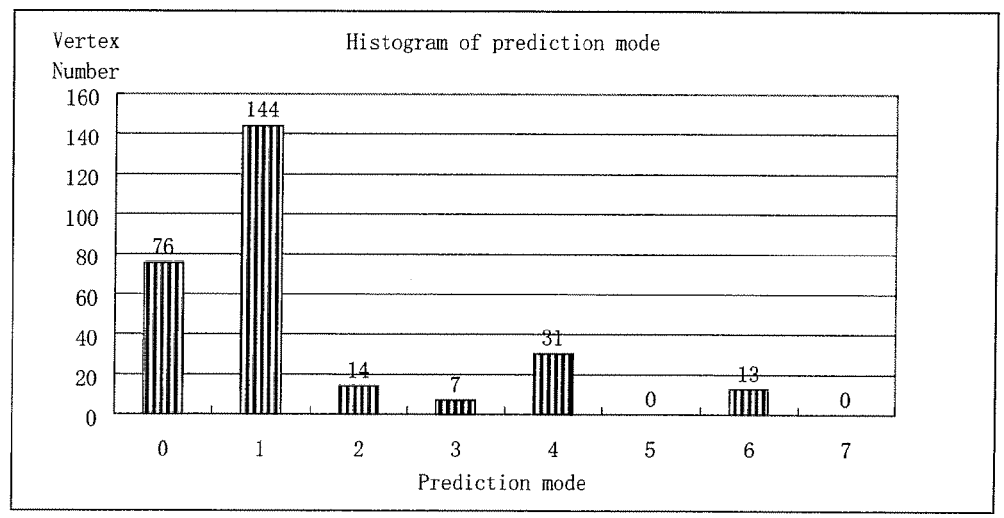

Though in this example the box is substantially rectangular, the invention is still advantageous for other examples. However, in that case there will be more than one cluster, and therefore more bits are required for identifying a cluster. Additional bits are required for encoding the residuals for 3D meshes with less regular structure. In any case, the invention is advantageous in every case where a limited range exists that includes many of the dihedral angles of the 3D mesh model and that has substantially empty neighboring ranges. The advantageous effect is the higher, the smaller the limited range is, the more dihedral angles use the range, and the larger the empty neighboring ranges are. If more than one cluster is defined, the different clusters need not have the same width. An example is shown in FIG. 13 a), as described later.

Figure 10:
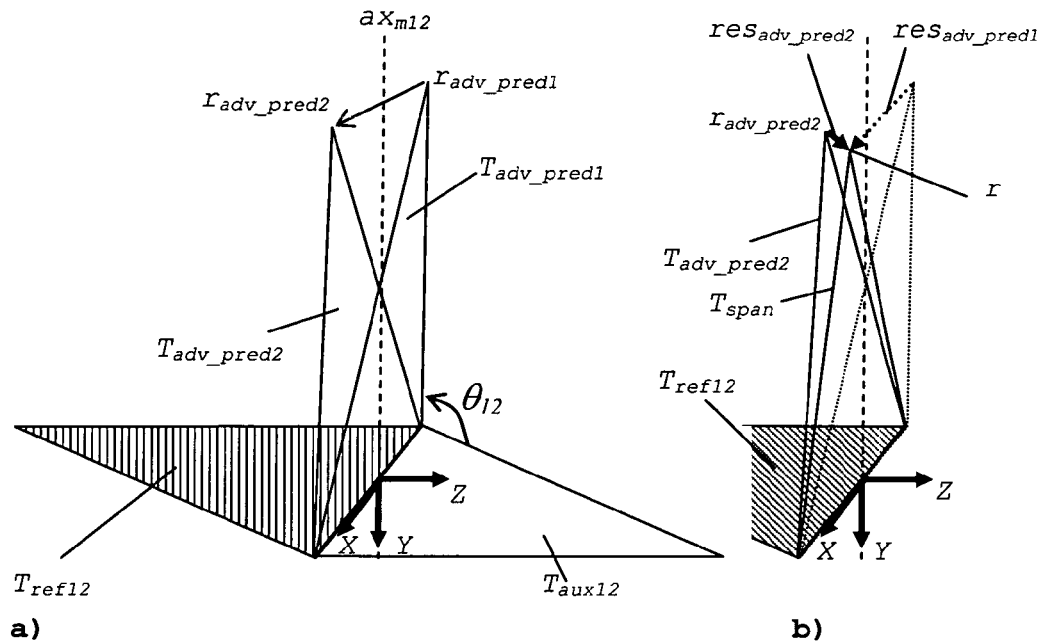
FIG. 10 the principle of improved triangle prediction using mirrored prediction triangles.

FIG. 10 shows the general principle of improved triangle prediction using mirrored prediction triangles. For a reference triangle $T_{ref12}$ a parallelogram extension $T_{aux12}$ is created, which is mapped by a first rotation to a first prediction triangle $T_{adv\_pred1}$, as defined by a first prediction vertex $r_{adv\_pred1}$. The first prediction triangle $T_{adv\_pred1}$ is then mirrored to a second prediction triangle $T_{adv\_pred2}$, as defined by a second prediction vertex $r_{adv\_pred2}$.

Thus, it is equivalent to a mirror mapping of the first prediction vertex $r_{adv\_pred1}$ to a second prediction vertex $r_{adv\_pred2}$. All these triangles have a common side. The first rotation is around the axis of the common side, by the dihedral angle $\theta_{12}$. For encoding, this is a representative dihedral angle determined according to the current 3D mesh model, as described above. For decoding, this dihedral angle is predefined and may be received from any source, or extracted from received data, usually as a coding parameter of the encoded 3D mesh model. The second prediction triangle $T_{adv\_pred2}$ is obtained from the first prediction triangle $T_{adv\_pred1}$ by mirror mapping on its middle axis $ax_{m12}$. This is equivalent to a rotation by 180° at this axis $ax_{m12}$. As a result, the base of the prediction triangle is mapped to itself (except that the end points are swapped).

Then the residuals $res_{adv\_pred1}$, $res_{adv\_pred2}$ between the spanning triangle $T_{span}$ and both prediction triangles $T_{adv\_pred1}$, $T_{adv\_pred2}$ are calculated, compared with each other and the residual that is easier/cheaper to encode (in this case $T_{adv\_pred2}$) is selected for predictive coding.

Figure 11:
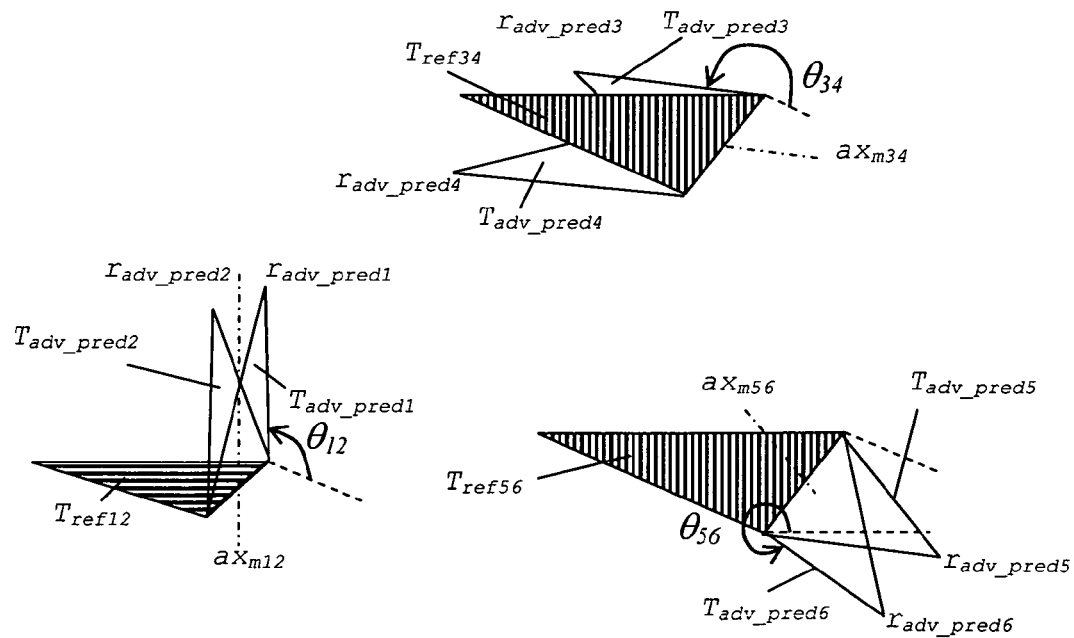
FIG. 11 improved triangle prediction using multiple different representative dihedral angles and mirrored prediction triangles.

FIG. 11 shows examples of different dihedral angles, and the approximate position of the resulting prediction triangles. In a first example, a dihedral angle $\theta_{12}$ at about 90° defines a first pair of prediction triangles $T_{adv\_pred1}$, $T_{adv\_pred2}$, in a second example a dihedral angle $\theta_{34}$ at about 200 degrees defines a second pair of prediction triangles $T_{adv\_pred3}$, $T_{adv\_pred4}$, and in a third example a dihedral angle $\theta_{56}$ at about 300 degrees defines a third pair of prediction triangles $T_{adv\_pred5}$, $T_{adv\_pred6}$. Further, FIG. 11 shows the respective axes $ax_{m12}$, $ax_{m34}$, $ax_{m56}$ that are used for the mirror mapping. Though the figures may be not exact in this respect, the axes are always orthogonal in the middle of the common side of the rectangles (also $ax_{m34}$ although it may look different due to perspective), and co-planar with the prediction triangles.

For those models with many sharp features, such as 3D engineering models, the proposed advanced prediction scheme improves the geometry compression efficiency significantly. The analysis step needs an extra scan of the geometry data which will slightly influence the encoding speed. However, the amount of geometry data is reduced and the decoder speed is hardly influenced by the advanced prediction.

By using those geometry-guided predictive schemes for compressing the connectivity data of 3D meshes, the advanced prediction method proposed here can further improve the efficiency of topology encoders, as the geometry prediction is better.

Although the clustering generally depends on the individual 3D mesh model, it may be useful to have predefined clustering ranges and representative dihedral angles, e.g. for certain kinds of models. In this case, it is not necessary to transmit the representative angles, as long as an unambiguous indication of the respective representative dihedral angle for the advanced prediction triangle is used. Also in this case it is possible and advantageous to use mirror mapping.

The first prediction triangle and the second prediction triangle have a common base side and are mirrored along an axis that is orthogonal to their common base side, so that they have the same angles and side lengths.

It depends on the details of the 3D mesh model how wide the range of angles around the representative angle is. The range is generally small, for example five degrees or less, and the representative angle is usually the medium value of a cluster. Typically, a local maximum within the range can be defined. However, it is also possible that 3D mesh models use mainly dihedral angles in a larger range. The invention can be advantageous if the angles within this range are substantially evenly spread, so that it is difficult to define a single local maximum within the range, and no dihedral angles are within comparable adjacent ranges. For example, a model may have many dihedral angles evenly spread in a range of 80-100 degrees, but no dihedral angles in ranges of 60-80 or 100-120 degrees. On the other hand, if the dihedral angles are not substantially evenly spread within the range, it may be better to define two or more local maxima and assign each maximum its own range.

The 3D mesh model can also be partitioned into sub-models of appropriate size, and each of the sub-models can be handled separately. In this case, the clustering and the representative dihedral angle are only valid within a sub-model. This is advantageous e.g. if a part of a 3D mesh model has significantly different surface structure than other parts.

One particular advantage of the invention is that dihedral angles need only be calculated between a next triangle and its respective reference triangle. That is, each triangle has only one reference triangle, which limits the amount of computing.

Figure 1:
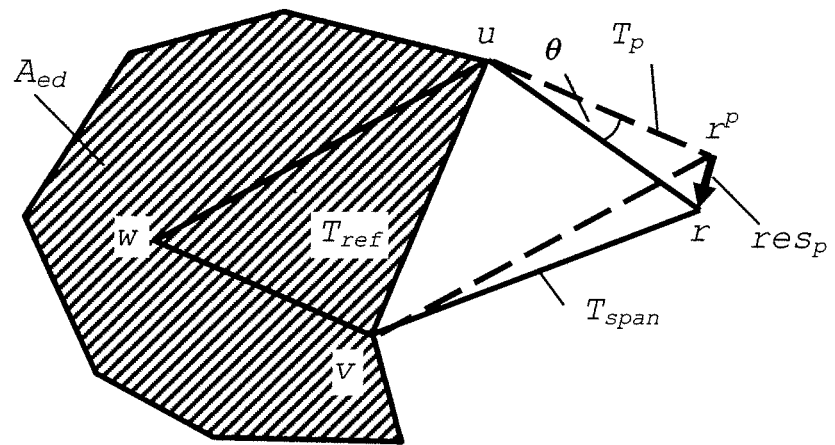
Figure 2:
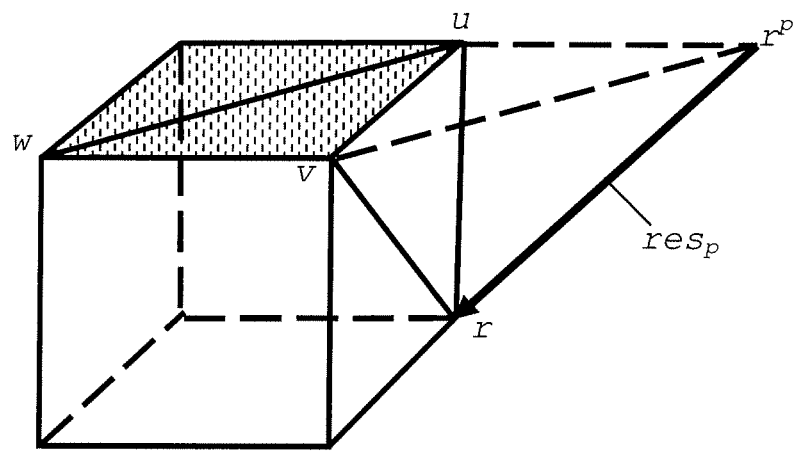
FIG. 2 a 3D mesh model of a box that uses conventional parallelogram prediction.
Figure 3:
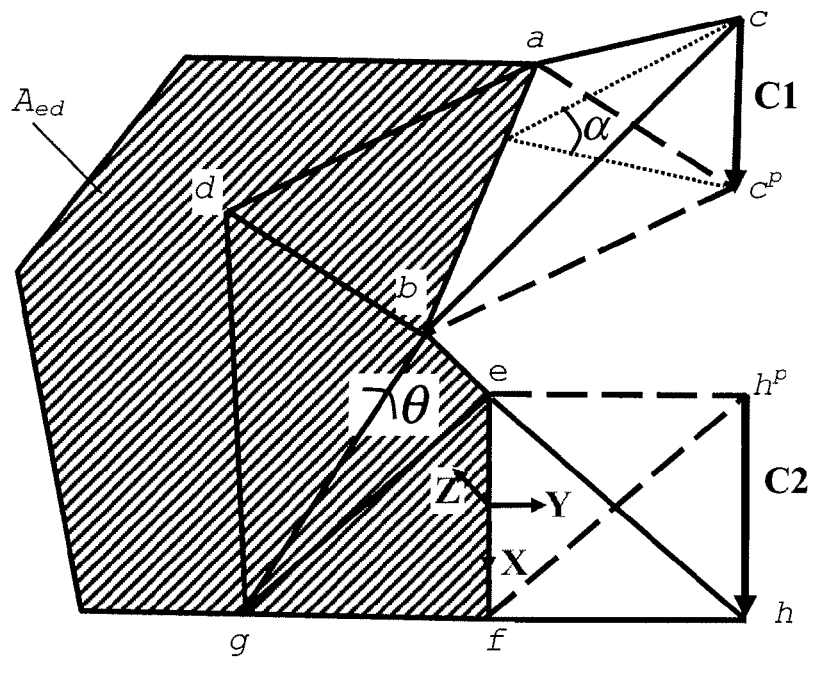
FIG. 3 typical failure cases of parallelogram prediction.
Figure 3:
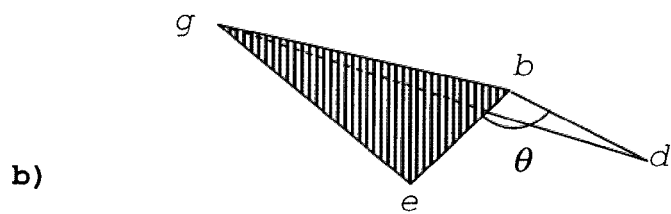
Figure 4:
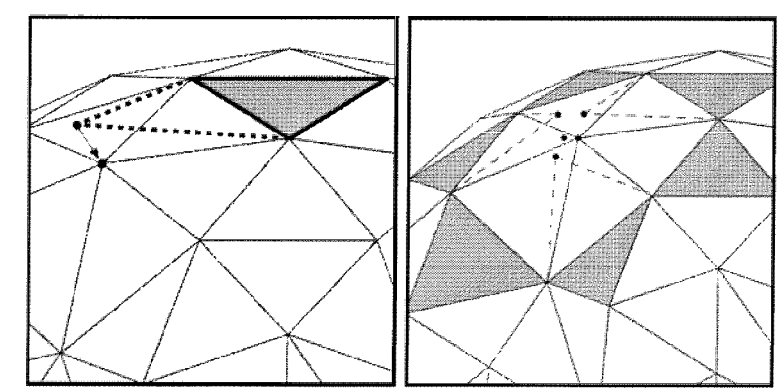
FIG. 4 multi-way parallelogram prediction.
Figure 5:
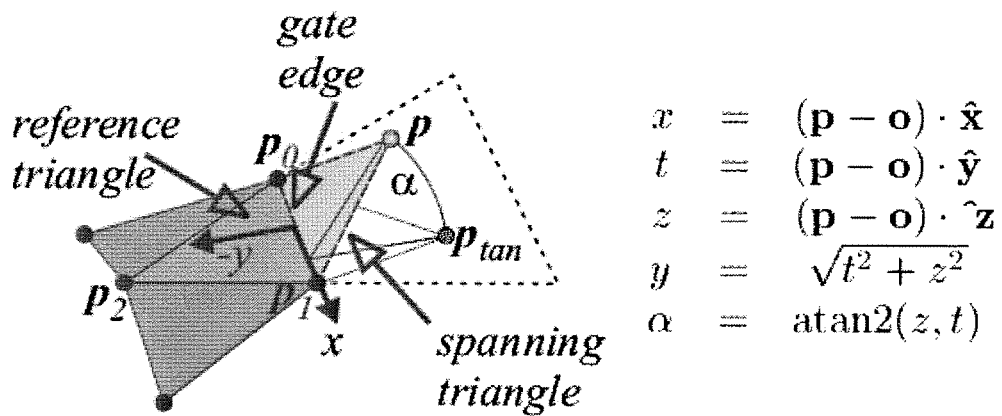
FIG. 5 a conventional local coordinate system.
Figure 6:
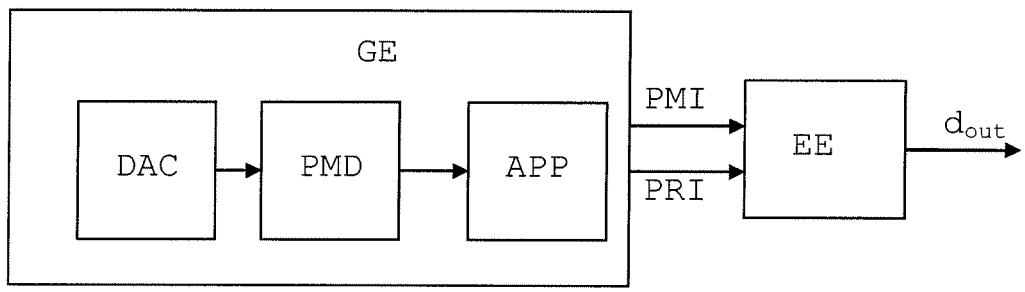
FIG. 6 a geometry encoder with parallelogram predictor.

FIG. 6 shows an encoder according to one aspect of the invention. The encoder comprises a geometry encoder portion GE and an entropy encoder EE. The geometry encoder comprises a dihedral angle clustering module DAC, a prediction mode definition module PMD and an advanced parallelogram prediction module APP. The dihedral angle clustering module DAC performs the analysis of the 3D mesh model, clustering of dihedral angles and generation of representative dihedral angles (if applicable). The prediction mode definition module PMD defines for each vertex the optimized encoding mode (either conventional, advanced based on a representative angle or advanced based on a representative angle and mirroring) and the advanced parallelogram prediction module APP generates the residuals, wherein it applies the encoding mode that was respectively defined by the prediction mode definition module PMD. As a result, prediction mode information PMI and prediction residual information PRI are provided to the entropy encoding unit EE, which performs entropy encoding and outputs entropy encoded data $d_{out}$. For example, the entropy encoding unit EE may generate a data format with a general header, in which among others different representative dihedral angles are defined, and a separate data portion for each vertex. The data portion of a vertex comprises its respective prediction mode indication PMI and entropy encoded prediction residual data PRI.

Figure 7:
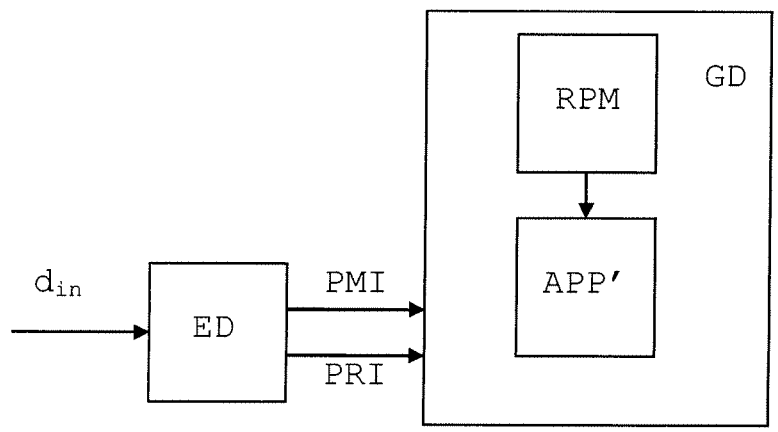
FIG. 7 a geometry decoder with parallelogram predictor.

FIG. 7 shows a decoder according to one aspect of the invention. The decoder comprises an entropy decoder portion ED and a geometry decoder portion GD. The entropy decoder receives entropy encoded input data $d_{in}$, performs entropy decoding and provides to the geometry decoder portion GD prediction mode information PMI and prediction residual information PRI. The geometry decoder portion GD comprises a decoding version of an advanced parallelogram prediction module APP', and performs prediction of the vertices according to their respective prediction mode information. The advanced parallelogram prediction module APP' gets information about the representative dihedral angles from a prediction mode reader unit RPM, which may e.g. extract this information from the header of a received signal (not shown).

Figure 12:
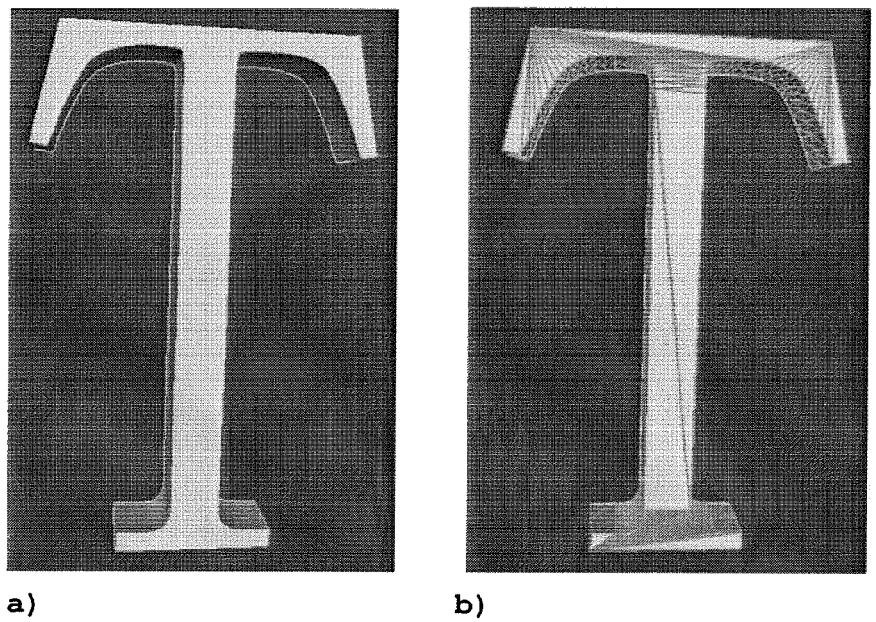
FIG. 12 an example of a 3D mesh model.

An example of a 3D mesh model is shown in FIG. 12. It was created with 3DsMax and has 288 vertices and 572 triangles. While in FIG. 12 b) the meshes are visible, they are in FIG. 12 a) covered by texture. This exemplary model comprises a number of dihedral angles, which were analyzed and can be clustered as listed in Table 1. The most right column shows how many vertices use the corresponding mode.

TABLE 1

Prediction modes of "T" model

| Prediction Mode | Rotation Angle (Degree) | Local Mirror Mapping? | # |
|---|---|---|---|
| 0 | 0 | 0 | 76 |
| 1 | 0 | 1 | 144 |
| 2 | 90 | 0 | 14 |
| 3 | 90 | 1 | 7 |
| 4 | 355 | 0 | 31 |
| 5 | 355 | 1 | 0 |
| 6 | 350 | 0 | 13 |
| 7 | 350 | 1 | 0 |

As can be seen from Tab.1, only dihedral angles around 0°, 90°, 350° and 355° appear. For each of them, a separate cluster is defined. Generally, the width of each cluster (i.e. the range of dihedral angles that fall into it) can be individually different. Further, most vertices do not choose prediction mode '0', which is the traditional flat parallelogram prediction scheme. This is the result of choosing the optimized residual, and shows the advantage of the advanced parallelogram predictor for compressing structures like the "T" model, even if the surface is rather smooth.

The width of ranges may be different. FIG. 13 a) shows an exemplary distribution of dihedral angles falling into a first range $R_1$ around a first representative dihedral angle $\alpha_1$ and into a different second range $R_2$ ($R_1>R_2$) around a second representative dihedral angle $\alpha_2$. However, in many artificially created 3D mesh models the ranges are very small, since only certain dihedral angles are used. FIG. 13 b) shows a histogram of the seven encoding modes of Tab.1. As can be seen, not all possible prediction modes are used. E.g. the dihedral angle of 350° is used only without mirror mapping (Local Mirror Mapping=0).

According to one aspect of the invention, bitstreams with encoded 3D mesh models are enhanced in two levels:

First on geometry level, i.e. in the header of a group of vertex data the prediction mode information includes:

one bit to indicate whether the proposed advanced parallelogram predictor is used. E.g. "1" means the proposed prediction method is employed, and "0" means that traditional solution is employed.

some bits to indicate the number of prediction modes, e.g. one byte. In the example of FIG. 13, the number of prediction modes is eight, so bits "00001000" are inserted into the bitstream.

bits to show the detail of each prediction mode. E.g. each mode uses 10 bits to represent its rotation angle, which is in the range of 0-359°. Another bit is used to indicate whether mirror mapping is used. Altogether 11 bits are used for each mode.

Second, on vertex level, i.e. in the header information of each vertex, the prediction mode information is added: Few bits representing the prediction mode of the current vertex. E.g. 3 bits are used for each vertex, sufficient for representing 8 modes.

For the above example, when using as entropy coder a range encoder[4] similar to the arithmetic or Huffman coder, it is possible to save about 9% storage, since the prediction residual is greatly reduced. By carefully choosing the entropy encoder, especially the one for compressing the prediction mode information, the gain can be further enlarged. This already takes into account that when using advanced parallelogram prediction scheme, the compressed geometry data includes not only prediction residual but also prediction mode information.

[4]"Range encoding: an algorithm for removing redundancy from digitized message", G. N. N. Martin, March 1979, Video & Data Recording Conference, Southampton, UK The invention is advantageous for encoders and decoders, and particularly for 3D mesh model encoders and decoders.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections. Reference numerals appearing in the claims are by way of illustration only and shall have no limiting effect on the scope of the claims. Drawings are not necessarily in proportion of the actual dimensions.

The invention claimed is:

1. A method for encoding a 3D mesh model composed of triangles, the method being executed by one or more processors or processing elements and comprising determining pairs of triangles, each pair being a reference triangle and a triangle to be predicted, wherein both triangles have a common side along a first axis;

for each of said pairs of triangles, determining a dihedral angle between the reference triangle and the triangle to be predicted;

analyzing for the 3D mesh model the dihedral angles of the pairs of triangles and, based on said analyzing, defining a plurality of ranges of dihedral angles, wherein a plurality of said dihedral angles are within each of the ranges of dihedral angles, and wherein each dihedral angle obtained from said analyzing the 3D mesh model is within not more than one of said ranges of dihedral angles;

defining for said ranges a plurality of representative dihedral angles, wherein for each range of dihedral angles a representative dihedral angle is defined;

if a dihedral angle between a reference triangle and a corresponding triangle to be predicted is within a first range from one of said ranges of dihedral angles, predicting said triangle to be predicted based on an enhanced prediction triangle, wherein the dihedral angle between the reference triangle and the enhanced prediction triangle is the representative dihedral angle of the first range;

calculating a residual between said triangle to be predicted and said enhanced prediction triangle, wherein the residual represents a measure of a difference between said triangle to be predicted and said enhanced prediction triangle; and encoding said residual between said triangle to be predicted and said enhanced prediction triangle, wherein an indication associated with the encoded residual indicates that the encoded residual refers to said representative dihedral angle, and wherein said indication indicates for each residual also a representative dihedral angle to which the residual refers.

2. Method according to claim 1, further comprising associating with the encoded 3D mesh model a value indicating said representative dihedral angle.

3. Method according to claim 1, wherein a first enhanced prediction triangle of a first mode and a second enhanced prediction triangle of a second mode are mirrored along a co-planar second axis that is orthogonal to said first axis, wherein the first and second enhanced prediction triangle have a common side, and wherein a second indication is associated with the encoded residual, the second indication indicating whether the residual refers to the prediction triangle of the first or the second mode.

4. Method according to claim 3, wherein in the first mode the enhanced prediction triangle corresponds to a co-planar parallelogram extension of the reference triangle that is rotated by said representative dihedral angle on said first axis, and wherein the enhanced prediction triangles of the first and second mode are co-planar and both have said side along the first axis common with the reference triangle.

5. Method according to claim 3, wherein for the triangle to be predicted two residuals according to the two prediction modes are calculated based on the two co-planar enhanced prediction triangles, the method further comprising
comparing the two residuals; and
selecting the residual that allows cheaper encoding of said reference triangle.

6. Method for decoding an encoded 3D mesh model being composed of triangles, the method being executed by one or more processor or processing elements and comprising:
determining a plurality of representative dihedral angles;
extracting from the encoded 3D mesh model residual data relating to a reference triangle and to a triangle to be reconstructed, wherein the data have associated an indication indicating a coding mode and indicating for each residual a representative dihedral angle to which the residual refers, the representative dihedral angle being one of said determined plurality of representative dihedral angles;
decoding from the residual data a residual comprising a residual triangle or residual vector, wherein the residual triangle or residual vector comprises at least one numerical value;
reconstructing the triangle to be reconstructed based on a prediction from said reference triangle, wherein the reference triangle and the reconstructed triangle have a common side along a first axis, and wherein in response to said indication a prediction mode is used that comprises combining the residual with a predefined prediction triangle, wherein the dihedral angle between the reference triangle and the predefined prediction triangle is said representative dihedral angle indicated by said indication, and wherein the at least one numerical value of said residual represents a measure of a difference between said triangle to be reconstructed and said predefined prediction triangle.

7. Method according to claim 6, wherein said plurality of representative dihedral angles is extracted from the encoded 3D mesh model.

8. Method according to claim 6, wherein in a first prediction mode the residual is added to a first prediction triangle and in a second prediction mode the residual is added to a second prediction triangle, the first and second prediction triangles having a common side with the reference triangle along said first axis and being mirrored on a second axis that is orthogonal to said first axis.

9. An apparatus for encoding a 3D mesh model composed of triangles that are represented by connectivity data, geometry data and property data, the apparatus comprising:
a dihedral angle clustering module having
a first determining unit configured to determine pairs of triangles, each pair being a reference triangle and a triangle to be predicted, wherein both triangles have a common side along a first axis;
an analyzing unit configured to analyze for the 3D mesh model the dihedral angles between the reference triangle and the triangle to be predicted of each of the pairs of triangles and to define a plurality of ranges of dihedral angles, wherein a plurality of said dihedral angles are within each of the ranges of dihedral angles, and wherein each dihedral angle of the 3D mesh model is within not more than one of said ranges of dihedral angles, and
a defining unit configured to define, for said ranges, a plurality of representative dihedral angles, wherein for each range a representative dihedral angle is defined;
an advanced parallelogram prediction module configured, if a dihedral angle between a reference triangle and a corresponding triangle to be predicted is within a first range of dihedral angles, the first range being one of said ranges of dihedral angles, to predict said triangle to be predicted based on an enhanced prediction triangle, wherein the dihedral angle between the reference triangle and the enhanced prediction triangle is the representative dihedral angle of said first range of dihedral angles, and
to calculate a residual between said triangle to be predicted and said enhanced prediction triangle, wherein the residual represents a measure of a difference between said triangle to be predicted and said enhanced prediction triangle; and
an entropy encoding module configured to encode the triangles of the 3D mesh model, wherein said residual between said triangle to be predicted and said enhanced prediction triangle is encoded, and wherein an indication is associated with the encoded residual, the indication indicating that the encoded residual refers to said representative dihedral angle and, for each residual, a representative dihedral angle to which the residual refers.

10. Apparatus according to claim 9, wherein a first enhanced prediction triangle of a first mode and a second enhanced prediction triangle of a second mode are mirrored along a co-planar second axis that is orthogonal to said first axis, wherein the first and second enhanced prediction triangle have a common side, and wherein a second indication is associated with the encoded residual, the second indication indicating whether the residual refers to the prediction triangle of the first or the second mode.

11. An apparatus for decoding an encoded 3D mesh model being composed of triangles, the apparatus having at least a geometry decoder portion comprising

- a first determining unit configured to determine a plurality of representative dihedral angles;
- a first extracting unit configured to extract from the encoded 3D mesh model residual data relating to a reference triangle and to a triangle to be reconstructed, wherein the data have associated an indication indicating a coding mode and indicating for each residual a representative dihedral angle to which the residual refers, the representative dihedral angle being one of said determined plurality of representative dihedral angles;
- a decoding unit configured to decode from the residual data a residual comprising a residual triangle or residual vector, wherein the residual triangle or residual vector comprises at least one numerical value;
- a reconstructing unit configured to reconstruct the triangle to be reconstructed based on a prediction from said reference triangle, wherein the reference triangle and the reconstructed triangle have a common side along a first axis, and wherein in response to said indication a prediction mode is used that comprises combining the residual with a predefined prediction triangle, wherein the dihedral angle between the reference triangle and the predefined prediction triangle is said representative dihedral angle indicating by said indication, and wherein the at least one numerical value of said residual represents a measure of a difference between said triangle to be reconstructed and said predefined prediction triangle.

12. Apparatus according to claim 11, wherein the geometry decoding portion further comprises a second extracting unit configured to extract a second indication from the encoded residual, wherein the reconstructing unit has at least a first and a second prediction mode and the second indication indicates whether a residual refers to a prediction triangle of the first or the second mode, wherein in the first prediction mode the residual is added to a first prediction triangle and in the second prediction mode the residual is added to a second prediction triangle, the first and second prediction triangles having a common side with the reference triangle along said first axis and being mirrored on a second axis that is orthogonal to said first axis.

* * * * *